(12) United States Patent
Lutz et al.

(10) Patent No.: US 7,437,400 B2
(45) Date of Patent: Oct. 14, 2008

(54) DATA PROCESSING APPARATUS AND METHOD FOR PERFORMING FLOATING POINT ADDITION

(75) Inventors: David Raymond Lutz, Austin, TX (US); Christopher Neal Hinds, Austin, TX (US)

(73) Assignee: ARM Limited, Cambridge (GB)

( * ) Notice: Subject to any disclaimer, the term of this patent is extended or adjusted under 35 U.S.C. 154(b) by 764 days.

(21) Appl. No.: 11/078,699

(22) Filed: Mar. 14, 2005

(65) Prior Publication Data

US 2006/0206556 A1 Sep. 14, 2006

(51) Int. Cl.
*G06F 7/485* (2006.01)
(52) U.S. Cl. .................................... 708/505
(58) Field of Classification Search .................. 708/505
See application file for complete search history.

(56) References Cited

U.S. PATENT DOCUMENTS

| | | | |
|---|---|---|---|
| 5,677,861 A * | 10/1997 | Inoue et al. ................ | 708/505 |
| 5,808,926 A | 9/1998 | Gorshtein et al. ........ | 364/748.11 |
| 6,085,212 A * | 7/2000 | Oberman ................... | 708/505 |
| 6,088,715 A * | 7/2000 | Oberman ................... | 708/505 |
| 6,094,668 A * | 7/2000 | Oberman ................... | 708/505 |
| 6,397,239 B2 * | 5/2002 | Oberman et al. .......... | 708/505 |
| 2006/0136543 A1 * | 6/2006 | Lutz et al. ................. | 708/670 |

OTHER PUBLICATIONS

A. Naini et al., "1-GHz HAL SPARC64® Dual Floating Point Unit with RAS Features", Proceedings of the 15th IEEE Symposium on Computer Arithmetic (ARITH'01).

* cited by examiner

*Primary Examiner*—David H Malzahn
(74) *Attorney, Agent, or Firm*—Nixon & Vanderhye P.C.

(57) ABSTRACT

A data processing apparatus and method are provided for adding n-bit significands of first and second floating point operands to produce an n-bit result. The data processing apparatus comprises determination logic for determining which of the first and second floating point operands is the larger operand. First adder logic is used, if predetermined criteria exists, to perform an addition of the n-bit significands of the first and second floating point operands to produce the sum value, whilst second adder logic is used, if the predetermined criteria does not exist, to perform that addition. Result logic can then derive the n-bit result from either an output of the first adder logic or an output of the second adder logic. If the addition is a like-signed addition, the predetermined criteria is determined to exist for a set of situations where the sum value produced by the first adder logic will require an effective 1-bit right shift to normalise the sum value, whereas if the addition is an unlike-signed addition, the predetermined criteria is determined to exist for a set of situations where the sum value produced by the first adder logic will require at least an effective 1-bit left shift to normalise the sum value.

11 Claims, 3 Drawing Sheets

DATA PROCESSING APPARATUS AND METHOD FOR PERFORMING FLOATING POINT ADDITION

BACKGROUND OF THE INVENTION

1. Field of the Invention

The present invention relates to a data processing apparatus and method for performing floating point addition, and in particular to a data processing apparatus and method for adding first and second n-bit significands of first and second floating point operands to produce an n-bit result.

2. Description of the Prior Art

A floating point number can be expressed as follows:

$$\pm 1.x * 2^y$$

where: x=fraction 1.x=significand (also known as the mantissa)

y=exponent

Floating point addition can take two forms, namely like-signed addition (LSA) or unlike-signed addition (USA). An LSA operation is performed if two floating point operands of the same sign are to be added, or if two floating point operands of different signs are to be subtracted. Similarly, a USA operation is to be performed if two floating point operands of different sign are to be added, or if two floating point operands of the same sign are to be subtracted. When referring in the present application to the addition of floating point operands and the addition of the n-bit significands of such operands, this should be taken as collectively referring to LSA or USA computations, and accordingly it will be appreciated that such a term covers both addition and subtraction processes.

When adding the n-bit significands of two floating point operands in order to produce an n-bit result, the following steps need to be performed:

1. A determination is made as to which of the two floating point operands is the largest.
2. The n-bit significand of the smaller operand is then aligned with the n-bit significand of the larger operand.
3. In the event of a USA operation, the smaller operand is inverted and a carry-in bit to subsequent adder logic is set. For an LSA operation, no such inversion is required, and the carry-in bit is not set.
4. The two significand values, manipulated as described above, are then added to produce a non-rounded sum.
5. The non-rounded sum is then normalised (shifted so that it has the form 1.x). The exponent is adjusted accordingly.
6. The bits of the non-rounded sum to the right of the least significant result bit (the result requires only the n most significant bits) are then evaluated to determine whether rounding is appropriate.
7. Then, a rounding increment is added to the significant bits of the result dependent on the rounding evaluation performed in step 6 above.
8. The rounded sum is then normalised (shifted so that it has the form 1.x). The exponent is adjusted accordingly.

With regard to the above sequence of steps, it has been found that not all additions require all of the above steps to be performed. Given this observation, it is known to provide a data processing apparatus which has two separate paths for performing floating point additions, one being referred to as the near path and the other being referred to as the far path.

In accordance with one known prior art technique, the exponent difference between the two input floating point operands is determined, and if the exponent difference is greater than one, then the addition is performed in the far path. Conversely, if the exponent difference is less than or equal to one, then the addition is performed in the near path. If the exponent difference is greater than one, then alignment logic needs to be provided to enable more than a non-trivial alignment to be performed, but the sum value produced will not require anything other than a non-trivial normalisation. Hence, the far path can be provided with alignment logic, but does not require any significant normalisation logic. Conversely, if the exponent difference is less than or equal to one, there is no need for any significant alignment logic, since only a trivial alignment will at most be required, but there is a requirement for normalisation logic, since when performing an unlike-signed addition massive cancellation may occur. Accordingly, to enable the resultant floating point value to be correctly normalised, it is then necessary to provide normalisation logic within the near path.

Accordingly, by providing a near path and a far path, the length of each path can be made shorter than would otherwise be the case if a single unitary path were provided for performing the floating point addition operation, and this can hence produce an increase in processing speed. For example, considering a pipelined processing logic example, the pipeline depth can be reduced by using a near path and a far path, which can give rise to an increase in processing speed when compared with a unitary processing path.

An adaptation of the above two-path implementation is to additionally use the far path for all like-signed additions. Hence, the near path is only used for unlike-signed additions whose exponent difference is less than or equal to one. When performing an unlike-signed addition, it is necessary to negate the smaller operand. Since the near path is only used for unlike-signed additions, then the smaller operand can be unconditionally negated in the near path. This slightly reduces the complexity of the near path.

Using either of the above two-path implementations, it is still necessary to provide rounding logic in both the near path and the far path to perform any appropriate rounding on the results of the addition performed in each path. U.S. Pat. No. 5,808,926 describes a variant of the second approach identified above, where the near path is only used when performing unlike-signed additions of operands which either have equal exponents, or have exponents that differ by one and for which the result of the addition operation requires shifting to be normalised. In situations where the result needs to be shifted to be normalised, this will mean that there are no bits to the right of the least significant bit of the result, and accordingly no rounding will ever be required. Accordingly, such an approach enables near path logic to be constructed which has no rounding logic within it.

The paper entitled "1-GHz HAL SPARC64 Dual Floating Point Unit with RAS Features" by A Naini et al, Proceedings of the 15$^{th}$ IEEE Symposium on Computer Architecture, 2001 also describes a data processing apparatus having a near processing path and a far processing path that adopts the approach set out in the above-mentioned U.S. Pat. No. 5,808,926.

Whilst the approach described in U.S. Pat. No. 5,808,926 removes the need for rounding logic in the near path, thus reducing latency and giving the near path the potential for requiring less power than the far path, it suffers from the problem that most additions need to be performed using the far path.

Accordingly, it would be desirable to provide a technique which enabled more addition operations to use the near path, whilst still allowing similar latency reductions and power savings to be achieved.

SUMMARY OF THE INVENTION

Viewed from a first aspect, the present invention provides a data processing apparatus for adding n-bit significands of first and second floating point operands to produce an n-bit result, the data processing apparatus comprising: determination logic operable to determine which of the first and second floating point operands is the larger operand; first adder logic operable, if predetermined criteria exists, to perform an addition of the n-bit significands of the first and second floating point operands to produce a sum value; second adder logic operable, if said predetermined criteria does not exist, to perform an addition of the n-bit significands of the first and second floating point operands; and result logic operable to derive the n-bit result from either an output of the first adder logic or an output of the second adder logic; if the addition is a like-signed addition, said predetermined criteria being determined to exist for a set of situations where the sum value produced by the first adder logic will require an effective one-bit right shift to normalise the sum value; and if the addition is an unlike-signed addition, said predetermined criteria being determined to exist for a set of situations where the sum value produced by the first adder logic will require at least an effective one-bit left shift to normalise the sum value.

In accordance with the present invention, first adder logic is used to perform an addition of the n-bit significands of first and second floating point operands if predetermined criteria exists, whereas otherwise second adder logic is used to perform that addition. If the addition is a like-signed addition, the predetermined criteria is determined to exist for a set of situations where the sum value produced by the first adder logic will require an effective 1-bit right shift to normalise the sum value, whilst for an unlike-signed addition, the predetermined criteria is determined to exist for a set of situations where the sum value produced by the first adder logic will require at least an effective 1-bit left shift to normalise the sum value. With regard to the unlike-signed addition situation, the at least 1-bit left shift will remove any bits to the left of the least significant bit, and accordingly no rounding will be required.

For the like-signed addition case, in situations where the sum value will require an effective 1-bit right shift to normalise the sum value, the rounding position will always be at the same bit position, and hence it has been found that rounding of the result of such a like-signed addition can be performed readily. In particular, in one embodiment, rounding can be performed for such like-signed addition computations performed by the first adder logic with the requirement for no additional cycles, no additional computation blocks, and only a minimal amount of additional logic.

Accordingly, by adopting the approach of the present invention, significantly more additions can be performed in the first adder logic (i.e. the near path) than is possible when adopting the approach in U.S. Pat. No. 5,808,926, whilst still allowing a similar reduction in latency and the potential for similar power savings.

The set of situations where the predetermined criteria is determined to exist may, for like-signed addition operations, be all situations where the sum value produced by the first adder logic will require an effective 1-bit right shift to normalise the sum value, and similarly for unlike-signed addition operations, may be all situations where the sum value produced by the first adder logic will require at least an effective 1-bit left shift to normalise the sum value. However, to detect all such situations would require significant logic to be provided, and it may in some instances be difficult to accommodate such logic within the data processing apparatus whilst still achieving desired timing. Accordingly, in one embodiment of the present invention, the set of situations for which the predetermined criteria is determined to exist is a subset of all possible situations. More particularly, in one embodiment, the predetermined criteria is determined to exist if: (a) the first and second floating point operands have equal exponents; (b) the addition is a like-signed addition, the first and second floating point operands have exponents that differ by one, and the leading fraction bit of the larger operand is a logic one value; or (c) the addition is an unlike-signed addition, the first and second floating point operands have exponents that differ by one, and the leading fraction bit of the larger operand is a logic zero value.

For unlike-signed addition computations, if the first and second floating point operands have equal exponents, it is clear that this will result in a sum value which will require at least an effective 1-bit left shift to normalise the sum value (i.e. to produce a significand for the sum which is "1.xxxxx"). Similarly, if for unlike-signed addition computations, the first and second floating point operands have exponents that differ by one, and the leading fraction bit of the larger operand is a logic zero value, then again this will cause the sum value produced to require at least an effective 1-bit left shift to normalise the sum value.

For like-signed addition computations, then if the floating point operands have equal exponents, this will result in the sum value requiring an effective 1-bit right shift to normalise the sum value. Similarly, if the first and second floating point operands have exponents that differ by one, and the leading fraction bit of the larger operand is a logic one value, then this will again cause the resultant sum value to require an effective 1-bit right shift to normalise the sum value.

Whilst the above conditions (a), (b) and (c) do not represent all situations where, for a like-signed addition an effective 1-bit right shift will be required to normalise the sum value, or for an unlike-signed addition at least an effective 1-bit left shift will be required to normalise the sum value, they do represent a subset of those situations which can readily be detected and for which the required logic to detect those situations will generally be able to meet the timing requirements of the data processing apparatus.

The rounding required to be provided in the first adder logic path to round the result of a like-signed addition computation can take a variety of forms. However, in one embodiment the data processing apparatus further comprises rounding logic operable, if said predetermined criteria exists and the addition is a like-signed addition, to determine a rounding increment value to be provided to the first adder logic prior to the first adder logic generating the sum value. Hence, in accordance with this embodiment, it is not required to await the generation of the sum value prior to performing any rounding, and instead the necessary rounding increment value is provided to the first adder logic along with the n-bit significands of the first and second floating point operands, such that the required rounding is incorporated during the generation of the sum value by the first adder logic. This provides a particularly efficient technique for performing rounding without requiring any additional cycles or any additional computation blocks.

In one particular embodiment of the present invention, the n-bit significands of the first and second floating point operands are extended to n+1 bits prior to being input to the first adder logic, if said predetermined criteria exists and the addition is a like-signed addition, the least significant bit of the n+1-bit extended significand of the larger operand being set to a logic one value. By taking such an approach, it has been found that the rounding logic can be embodied in a particularly efficient manner.

More particularly, in one such embodiment, the rounding logic is operable to determine as the rounding increment value a carry-in value to be provided to the first adder logic, the carry-in value being set equal to the result of an XOR operation performed on a bit of the first n-bit significand and a bit of the second n-bit significand which at the time of the addition are in the least significant bit position for the n-bit result. This particular approach enables the required rounding increment value to be provided with only a minimal amount of logic being required to produce the rounding increment value.

In one embodiment, the determination as to whether the predetermined criteria exists or not is made at an early enough stage that only one of the first adder logic and second adder logic is caused to perform the addition. However, in another embodiment, such determination does not occur early enough for such an approach to be taken, and instead both the first adder logic and the second adder logic start to perform the addition. However, in such embodiments, the addition takes multiple cycles to perform, and if the predetermined criteria is determined to exist, a control signal is issued to the second adder logic to cause that second adder logic to not complete the addition of the n-bit significands of the first and second floating point operands. This can yield significant power savings, since the second adder logic of one embodiment contains significant logic in the later stage(s), and accordingly turning off that later stage, or stages, when the predetermined criteria is determined to exist, will result in significant power savings.

If desired, in such embodiments, the analogous situation can be used for the first adder logic, such that if the predetermined criteria is determined not to exist, a control signal can be issued to the first adder logic to cause that first adder logic to not complete the addition of the n-bit significands of the first and second floating point operands. However, in this instance, the potential power saving is significantly less, since the later stage(s) of the first adder logic do not typically contain as much logic as the corresponding stage(s) of the second adder logic.

The floating point operands may take a variety of forms. However, in one embodiment, the first and second floating point operands are single-precision floating point operands, and n is 24.

In one embodiment, the rounding logic is operable to perform rounding in accordance with a round-to-nearest rounding mode. In accordance with the round-to-nearest rounding mode, also referred to as the "Round-to-Nearest-Even" (RNE) rounding mode, values that are more than half way between two representable results are rounded up, whilst values that are less than half way between two representable results are rounded down (or truncated). Values that are exactly half way between two representable results are rounded to a final result that has the least significant fraction bit equal to zero, thus making the result even.

The first adder logic can take a variety of forms. However, in one embodiment, the first adder logic comprises an adder that is at least n+1 bits wide. This hence enables the first adder logic to accommodate the n+1-bit extended significands produced in one embodiment of the present invention. When such an n+1-bit wide first adder logic is performing a like-signed addition, the addition will produce a carry-out value of 1, due to the nature of the type of like-signed additions that are allowed to be performed in the first adder logic. Hence, that carry-out value of 1 can be implied when performing the effective 1-bit right shift required to normalise the sum value produced.

Viewed from a second aspect, the present invention provides a data processing apparatus for adding n-bit significands of first and second floating point operands to produce an n-bit result, the data processing apparatus comprising: determination means for determining which of the first and second floating point operands is the larger operand; first adder means for performing, if predetermined criteria exists, an addition of the n-bit significands of the first and second floating point operands to produce a sum value; second adder means for performing, if said predetermined criteria does not exist, an addition of the n-bit significands of the first and second floating point operands; and result means for deriving the n-bit result from either an output of the first adder means or an output of the second adder means; if the addition is a like-signed addition, said predetermined criteria being determined to exist for a set of situations where the sum value produced by the first adder means will require an effective one-bit right shift to normalise the sum value; and if the addition is an unlike-signed addition, said predetermined criteria being determined to exist for a set of situations where the sum value produced by the first adder means will require at least an effective one-bit left shift to normalise the sum value.

Viewed from a third aspect, the present invention provides a method of operating a data processing apparatus to add n-bit significands of first and second floating point operands to produce an n-bit result, the method comprising the steps of: determining which of the first and second floating point operands is the larger operand; if predetermined criteria exists, employing first adder logic to perform an addition of the n-bit significands of the first and second floating point operands to produce a sum value; if said predetermined criteria does not exist, employing second adder logic to perform an addition of the n-bit significands of the first and second floating point operands; and deriving the n-bit result from either an output of the first adder logic or an output of the second adder logic; if the addition is a like-signed addition, said predetermined criteria being determined to exist for a set of situations where the sum value produced by the first adder logic will require an effective one-bit right shift to normalise the sum value; and if the addition is an unlike-signed addition, said predetermined criteria being determined to exist for a set of situations where the sum value produced by the first adder logic will require at least an effective one-bit left shift to normalise the sum value.

BRIEF DESCRIPTION OF THE DRAWINGS

The present invention will be described further, by way of example only, with reference to an embodiment thereof as illustrated in the accompanying drawings, in which.

DESCRIPTION OF AN EMBODIMENT

Figure 1:
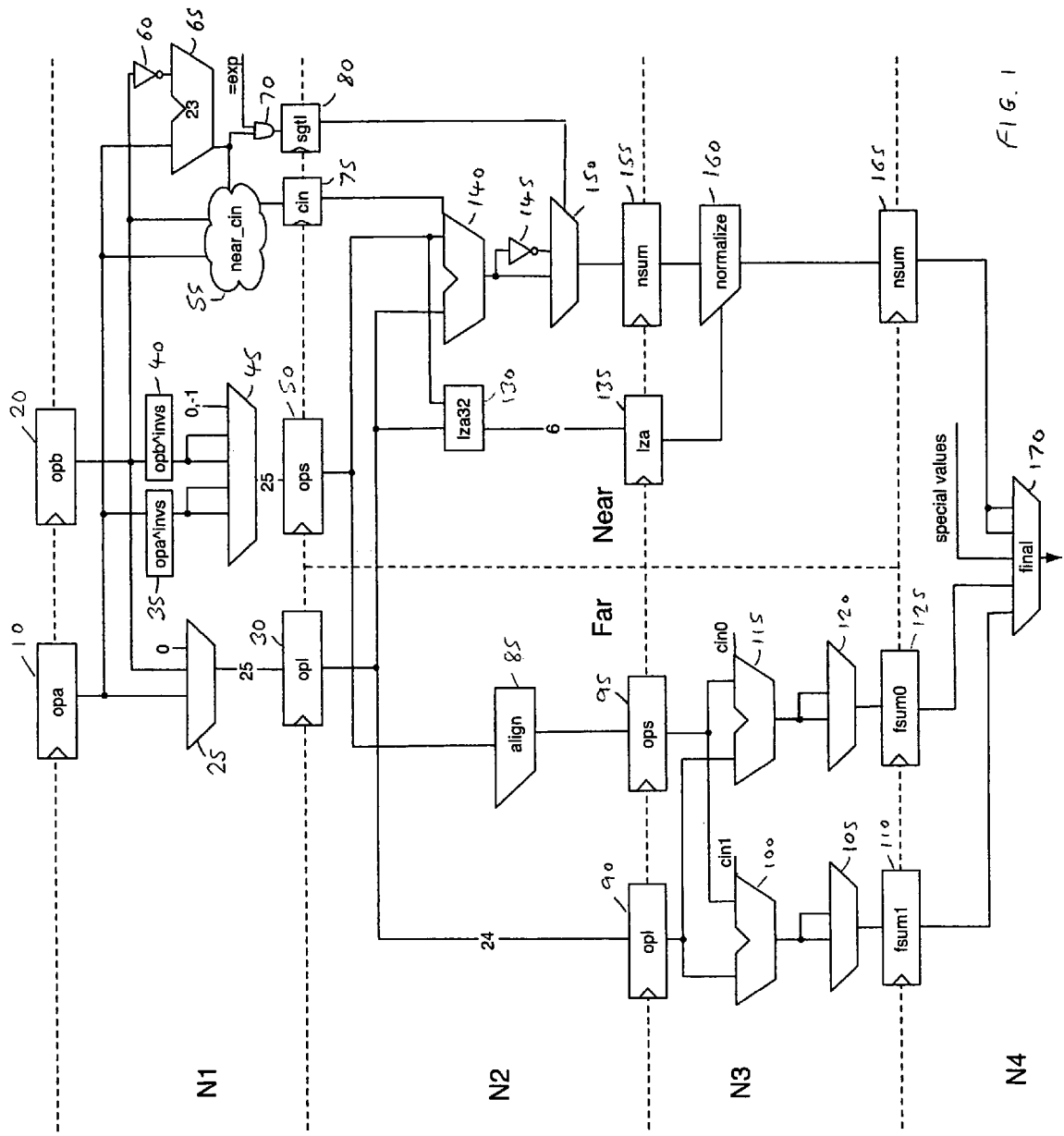
FIG. 1 is a block diagram of a data processing apparatus in accordance with one embodiment of the present invention.

FIG. 1 is a block diagram illustrating logic provided within a data processing apparatus of one embodiment of the present invention to add first and second n-bit significands of two floating point operands in order to produce an n-bit final result. For the sake of illustration, it is assumed that the input operands are single precision floating point operands, and accordingly each operand consists of a 1-bit sign value, an 8-bit exponent value and 23-bit fraction value. The 23-bit fraction values for both floating point operands will be provided to the registers 10, 20, respectively.

As shown in FIG. 1, the data processing apparatus includes a four-stage pipeline for performing the addition. Most of the fourth stage is used for forwarding, hence for example allowing the result to be forwarded back as an input to the addition pipeline in order to enable accumulate operations to be performed. Given that most of the fourth stage is used for forwarding, the bulk of the addition logic is provided in the first three stages.

The first stage (N1) is shared between the near path and the far path, and takes the original fraction values, here referred to as opa and opb, and based on an exponent comparison performed by logic not shown in FIG. 1, generates two new operands, opl and ops. Opl is the significand of the larger operand and ops is the significand of the smaller operand. As can be seen from FIG. 1, the multiplexer 25 receives both opa and opb, and dependent on a control signal it receives indicating which is the fraction of the larger operand, then generates the significand of the larger operand. Multiplexer 25 does this by adding a leading 1 to the selected fraction. In addition, in the disclosed embodiment, the significand is further extended by adding an additional least significant bit which typically is set to zero, but as will be discussed later will be set to a logic one value for LSA operations to be performed in the near path.

The logic elements 35 and 40 receive the fraction values opa and opb, respectively, and either output those values unaltered if the addition is an LSA, or alternatively invert the received values if the addition to be performed is a USA operation. The outputs of the logic units 35, 40 are provided to the multiplexer 45, along with 1-bit right shifted versions of those outputs. The multiplexer then receives a control signal indicating which fraction is the fraction of the smaller operand and generates a significand from that fraction. For LSA operations where the exponent difference is zero, the non-right shifted output from the appropriate one of the logic units 35, 40 will be selected, a logic one value will be prepended to the 23-bit fraction, and a logic zero value will be added at the other end as a new least significant bit, giving rise to a 25-bit significand stored as ops in register 50. For USA operations where the exponent difference is zero, then a zero will be prepended to the selected fraction, and a logic one value will be added as a new least significant bit to produce the 25-bit significand. For LSA operations where the exponent difference is one, then the bit sequence "01" will be prepended to the fraction in order to produce the 25-bit significand, whereas for a USA operation where the exponent difference is one, then the sequence of bits "10" will be prepended to the fraction bit to produce the 25-bit significand.

Where the exponent difference is zero, then opa will be selected as the fraction of the largest operand, and the multiplexers 25, 45 will make their selections accordingly. However, it is possible that when the exponent difference is zero, this selection of opa as the fraction of the largest significand may be incorrect. Whilst this will not matter for LSA operations, it will be relevant for USA operations. This situation is detected by the logic elements 60, 65. In particular, the adder 65 receives opa and an inverted version of opb and performs an addition of those values. In such situations, if the carry-out value from the 23-bit adder is set, this will indicate that opb is in fact the fraction of the larger operand. If this carry-out signal is set and the exponent difference is zero, causing the AND gate 70 to receive logic one values at both of its inputs, then this will cause a logic one value to be stored in the register 80. This is only done for USA operations, and for LSA operations the sgtl signal is explicitly set to zero irrespective of the carry-out value from adder 65.

The carry-out value from the adder 65 will also be provided to the logic 55 which is arranged to determine a carry-in value to be forwarded to the adder 140 in the near path. The logic 55 is also arranged to receive two bits from each of opa and opb and also an indication as to whether the exponent difference is zero or one, and based on this information, is arranged to produce a carry-in value which is stored within the register 75. The operation of the logic 55 will be discussed later with reference to FIG. 3. For the moment, it is sufficient to say that the logic 55 can for like-signed additions passing through the near path produce an appropriate carry-in value which, in combination with the setting of the least significant bit of the opl operand 30 to a logic one value, produces the required rounding appropriate for the RNE rounding mode. Further, for USA operations passing through the near path, the carry-in value is set to a logic one value unless the sgtl bit 80 is set, in which case the carry-in signal is set to a logic zero value and the multiplexer 150 shown in the near path is arranged to select as its output the signal it receives via inverter 145.

Figure 2:
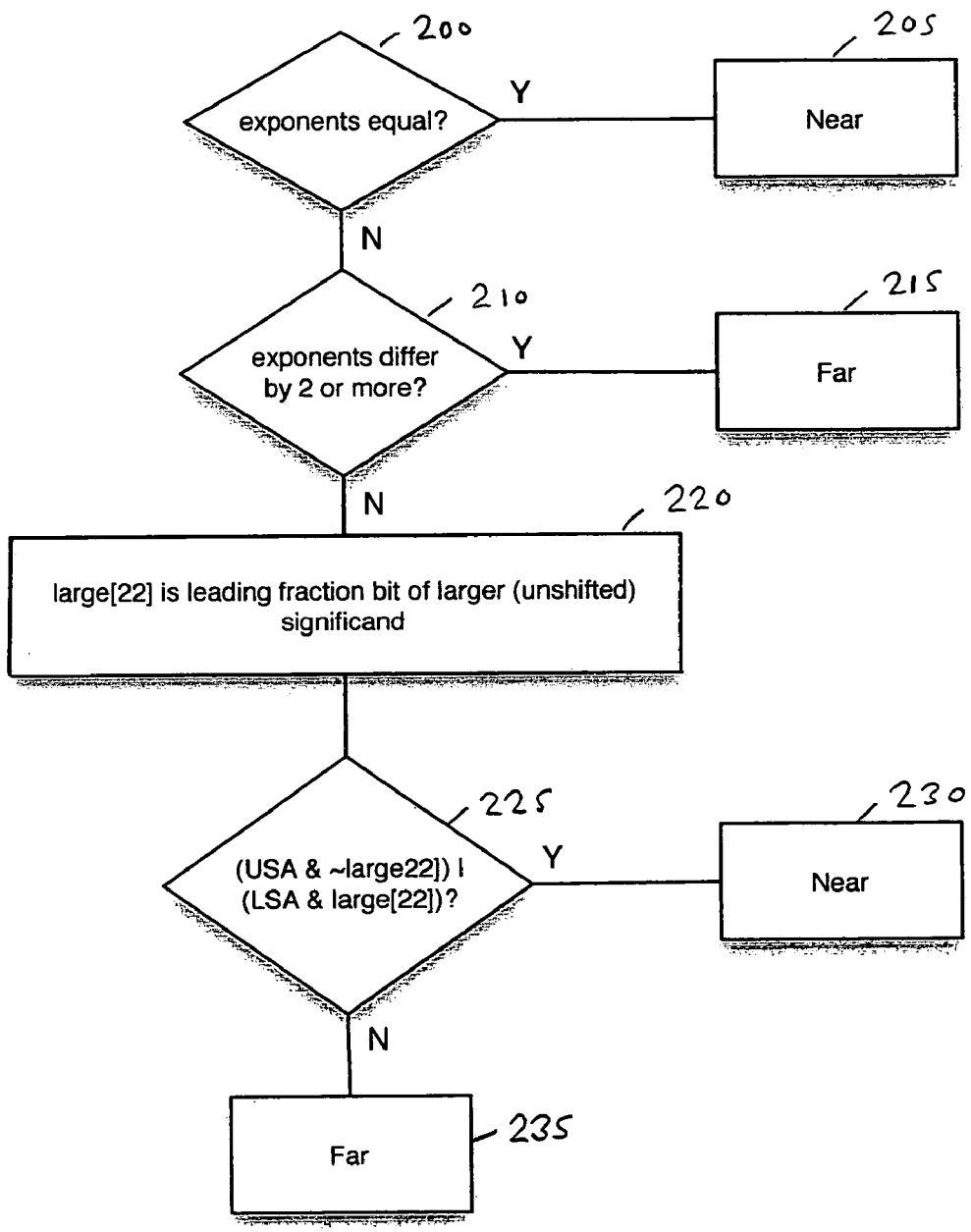
FIG. 2 is a flow diagram illustrating the steps performed in accordance with one embodiment of the present invention in order to determine whether an addition should be performed within the near path or the far path of FIG. 1.

During stage N1, control logic (not illustrated in FIG. 1) is used to determine which of the far path or near path should be used to perform any particular addition. The process performed by this control logic is illustrated in FIG. 2. At step 200, it is determined whether the exponents are equal, and if so this indicates at step 25 that the near path should be used for performing the addition. If the exponents are not equal, then at step 210 it is determined whether the exponents differ by two or more, and if so the process proceeds to step 215, where the far path is determined to be the path for performing the addition.

If at step 210 it is determined that the exponents do not differ by two or more, then this will mean that the exponents differ by one. At step 220, bit 22 of the larger significand is evaluated, this being the leading fraction bit of the larger significand. Then, at step 225 it is determined whether the addition is either an unlike-signed addition and that leading fraction bit is a logic zero value or whether the addition is a like-signed addition and that leading fraction bit is a logic one value. If either of these conditions are met, then the process proceeds to step 230, where it is determined that the near path should be used for the addition. Otherwise, the process proceeds to step 235 where it is determined that the far path should be used for the addition.

Whilst this determination takes place during stage N1, in one embodiment the result is not available until the end of the N1 stage, and accordingly during the N2 stage both the near path and the far path must execute their required functions. However, the registers 90, 95, 110 and 125, or 135, 155 and 165, on either the N2/N3 boundary or the N3/N4 boundary can be turned off in dependence on the determination performed by the control logic in accordance with the flow of FIG. 2. Accordingly, if the control logic determines that the near path should be used, then it is possible to turn off registers 90, 95, 110 and 125, this giving rise to significant power savings. In particular, as can be seen from FIG. 1, the near path has only a normalise block 160 and an additional multiplexer 170 provided in stage N3 and N4, compared to the two adders 100, 115, two multiplexers 105, 120, final multiplexer 170 and additional registers required on the far path.

Figure 3:
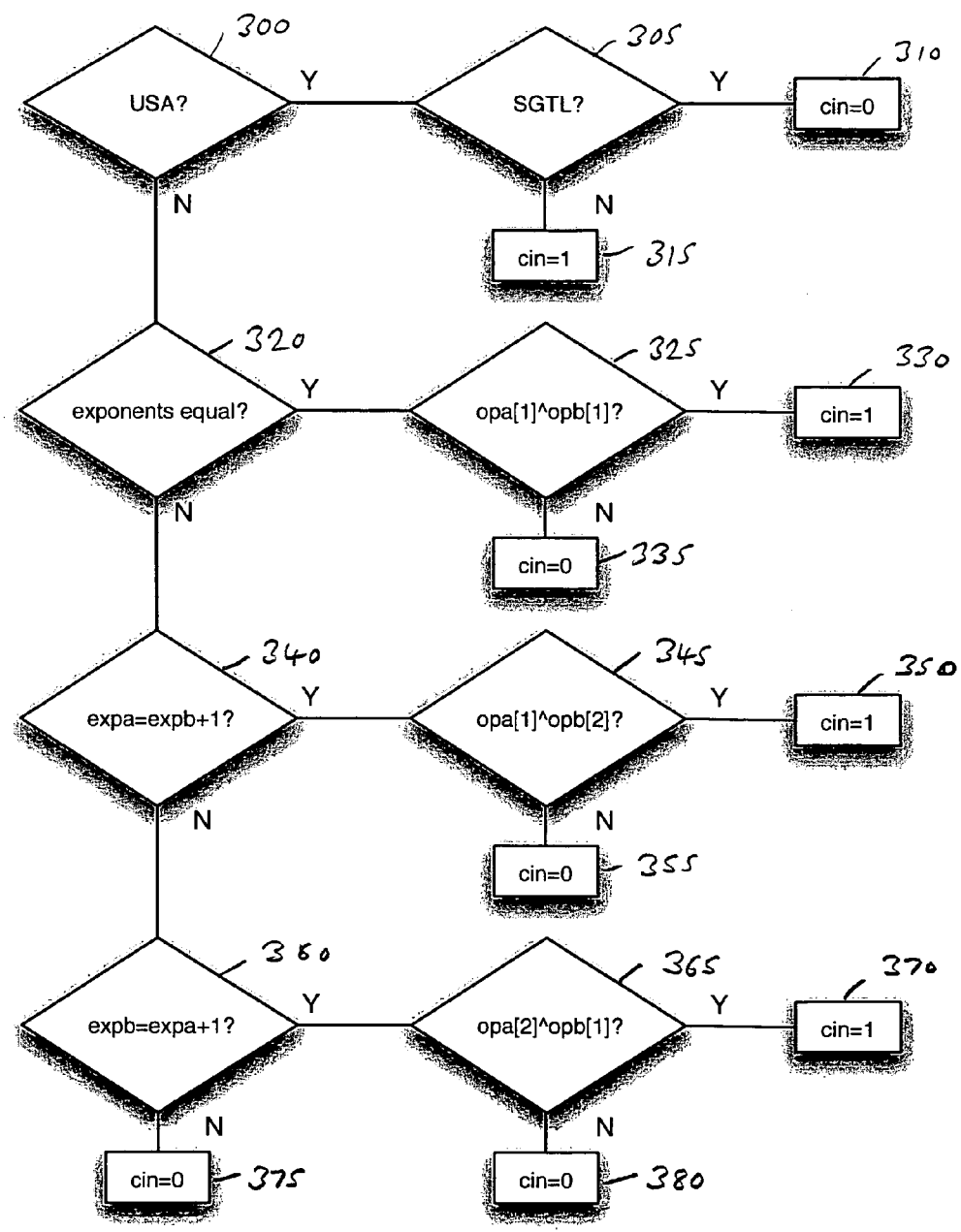
FIG. 3 is a flow diagram illustrating the steps performed within the rounding logic 55 of FIG. 1 in accordance with one embodiment of the present invention.

In addition, as will be described later with reference to FIG. 3, the embodiment of the present invention enables a greater proportion of addition operations to proceed through the near path when compared with typical prior art approaches, thus further reducing the overall power consumption.

Considering an addition operation that is required to be performed in the near path, it can be seen that in stage N2 the values of op1 and ops are provided to the adder 140 which also receives a carry-in value from register 75, and then generates an output value which is passed to the multiplexer 150. In addition an inverted version of that output is provided to the multiplexer 150 via the inverter 145. If the sgt1 bit 80 is set (which will only ever be the case for some USA operations), then this will cause the multiplexer 150 to select as its output the input received via inverter 145, whereas otherwise the multiplexer 150 will output the value it receives directly from the adder 140. The output of the multiplexer 150 is then stored as an initial sum value in the register 155.

As mentioned earlier, when the input floating point operands have exponents that differ at most by one, then it is possible that when performing an unlike-signed addition operation within the near path logic, massive cancellation may occur. This means that when logically subtracting one significand from the other, the result may have a significant number of leading zeros. The presence of such leading zeros is detected by the leading zero anticipator 130 which is arranged to receive the op1 and ops values from registers 30, 50. The leading zero anticipator 130 is constructed in the standard manner, and produces a 6-bit output signal identifying the number of leading zeros predicted to exist in the sum stored in the register 155, this value being stored in the register 135. Normalisation logic 160 is then provided in pipeline stage N3 for normalising the value stored in the register 155 based on the LZA value output from the register 135, with the output of the normaliser then being stored as a sum value in register 165.

As will be appreciated by those skilled in the art, since the leading zero anticipator 130 is an anticipator of the number of leading zeros, it is possible that the adjustment performed by the normalisation logic 160 may be out by one bit. Hence, once the normalised result has been produced by the normalisation logic 160, the output is evaluated to check whether the most significant bit is a logic one value. If it is, then no further adjustment is required, whereas if the most significant bit is a logic zero value, then a further one bit adjustment is required. As shown in FIG. 1, the multiplexer 170 is arranged to receive both the value stored within the register 165 and a 1-bit adjusted version, so that the correctly aligned output value can be produced.

When performing like-signed additions within the near path, it is known that all such like-signed additions will require an effective 1-bit right shift to normalise the sum value due to the nature of the like-signed addition operations that are allowed to take place within the near path. In one embodiment, this 1-bit right shift can effectively be performed by the normalise logic 160. In particular, in one embodiment the normalizer is 32 bits wide, which is wider than it needs to be. The normalizer only needs to be wide enough to deal with the maximum input that it may receive, which in the example embodiment is n+2 bits wide, i.e. 26 bits wide for single precision operands. Given at least a 26-bit wide normalizer, this can be arranged to always shift left in dependence on the LZA value received from register 135, but with a predetermined shift (in the case of a 26-bit normalizer a shift of zero) corresponding to an effective right shift of 1 bit.

With regard to the far path, this is used to perform all additions which do not meet the criteria for using the near path. Since such additions will include additions where the exponent difference is greater than two, then alignment logic 85 is provided to enable the ops operand to be aligned with the op1 operand prior to performing the addition. This alignment takes place in stage N2, and results in op1 being passed unaltered from register 30 to register 90, and the aligned version of ops being stored in register 95.

In stage N3, two adders 100, 115 are used to perform separate additions using the op1 90 and ops 95 values, each adder 100, 115 receiving a carry-in value determined for that adder. The two sum values produced can be subjected to any required trivial normalisation by multiplexers 105, 120, resulting in two sum values fsum1 and fsum0 being stored in the registers 110, 125, respectively. From these two values, the multiplexer 170 can select a final n-bit result which is correctly rounded having regard to the RNE rounding mode by appropriate selection of one or the other of the two sum values, and in some cases with the value of the least significant bit flipped. The details of the addition performed in the far path is described in commonly assigned earlier filed U.S. patent application Ser. No. 11/017,217, the contents of which are incorporated herein by reference. Since the addition performed within the far path is not germane to the present invention, it will not be described further herein.

The logic zero input to multiplexer 25 is used in situations where both opa and opb are zero and an LSA operation is being performed. The zero input to multiplexer 45 is used for LSA operations where zero is being added to any floating point number, and the "−1" input is used for situations where zero is being subtracted from any floating point number. The reason why "−1" is selected in this situation is because the carry-in value provided later to the appropriate adder 100, 115, 140 will cause "+1" to be added during the addition. Most zero additions are passed through the far path logic since the exponent difference of the input operands tends to be large.

Considering again the additions performed within the near path logic, near path LSAs are more complex than near path USAs because rounding has to be incorporated. For LSAs, processing in the near path is restricted to cases where it can quickly be determined that the sum of the n-bit significands will generate a carry. Since the carry is guaranteed, the rounding position is always at the same place.

If significands A and B are normal n-bit numbers (i.e. the high order bit is one), then the near path of one embodiment is arranged to compute C=A+B+carryin, where carryin will be computed in order to round correctly. The near path computes two different cases of LSAs.

Case 1: Exponents Equal

Since the inputs A and B are normal numbers, the sum of the n-bit significands (C=A+B) will have n+1 significant bits. In accordance with one embodiment of the present invention, an extra zero bit is added to the right of each input significand by the multiplexers 25, 45, so in actual fact an n+2 bit sum is produced, with the high order bit being 1 and the low order bit being zero. Since the high order bit is 1, C consists of a normal n-bit result, with two extra low-order bits. In order to round C, its 3 low order bits must be assessed.

For single precision numbers:

A=1 a22 a21 ... a2 a1 a0 0

B=1 b22 b21 ... b2 b1 b0 0

C=1 c22 c21 c20 ... c1 c0 G S

Rounding is computed by looking at L (which is just bit c0), G, and S. For RNE rounding mode, the rounding increment to be introduced at bit L is given by the equation:

$$(L \text{ AND } G) \text{ OR } (G \text{ AND } S)$$

In the above case, S=0, so the rounding increment is given by:

L AND G

Since there can be no carry out of S:

G=a0 XOR b0, and

L=(a1 XOR b1) XOR (a0 AND b0)

If a rounding increment is required, it is accomplished by adding 1 at the L position. Let L'=a1 XOR b1. It has been found that adding L' to the guard bit position is equivalent to correctly rounding. If G is zero, then adding L' to the guard bit position does not generate any carry into the significant part of C. If G is 1, then L'=L, and adding L' generates a carry into the significant part of C if L=1, which is what is required for RNE rounding mode.

In one embodiment of the present invention, the mechanism for adding L' into the correct position of the sum is to replace the low order zero in A with a 1, and set carryin=L'.

Case 2: exponents differ by 1, and high order fraction bit of larger significand is 1.

Without loss of generality, assume that A has the larger exponent, and append an extra low order zero to A. Since the exponents differ by 1, we shift the significand of B right by one bit position so that bits are aligned correctly for addition. For single precision numbers:

A=1 1 a21 . . . a2 a1 a0 0
B=0 1 b22 . . . b3 b2 b1 b0
C=1 c22 c21 c20 . . . c1 c0 G S

There can be no carry out of S, so

S=b0
G=a0 XOR b1, and
L=c0=(b2 XOR a1) XOR (b1 AND a0).

Again, if a rounding increment is required, it is accomplished by adding 1 at the L bit position. Let L'=a1 XOR b2. It has been found that adding L' and 1 to the sticky bit position is equivalent to correctly rounding. As discussed above, for the RNE rounding mode, the rounding increment to be introduced at bit L is given by the equation:

(L AND G) OR (G AND S)

If G=0, then the maximum sum if S (i.e. b0) and L' are both set will still not propagate past the G bit position, so there is no rounding, which is what is required.

If G=1 and S=1 a rounding increment is needed. This is indeed what happens because we add S and 1, which generates a carry in to G, which in turn generates a carry in to L. The value of L' is irrelevant.

If G=1 and S=0, then a rounding increment is needed if L is set. Since G=1, L=L', and adding L' and 1 at the S bit position generates a carry into G if L is set, which in turn generates a carry in to L.

In one embodiment of the present invention, the mechanism for adding L' into the correct position of the sum is the same as in case 1, i.e. to replace the low order zero in A with a 1, and set carryin=L'.

As described earlier with reference to FIG. 1, the above functionality is performed by causing the multiplexer 25 to set the least significant bit of the 25-bit opl operand to a logic one value in the event that the addition is a like-signed addition to be performed in the near path, and the logic 55 is then arranged to generate the required carry-in value to implement the above functionality. This will be described further with reference to FIG. 3. Firstly, at step 300, the logic 55 determines whether the operation to be performed in the near path is a USA operation. If it is, then at step 305 it is determined whether the SGTL bit 80 is set and if so the carry-in value stored in register 75 is set to a logic zero value. If at step 305 it is determined that the SGTL bit is not set, then at step 315 the carry-in value 75 is set to a logic one value.

If at step 300 it is determined that the operation is not a USA operation, i.e. it is an LSA operation, then at step 320 it is determined whether the exponents of both floating point operands are equal. If so, then at step 325 bits a1 of opa and b1 of opb are XORed together, and if the result of that computation is a logic one value, then the carry-in is set to a logic one value at step 330, whereas otherwise the carry-in bit is set to a logic zero value at step 335.

If at step 320 it is determined that the exponents are not equal, then because the addition is being performed in the near path, it is known that the exponent difference is one. At step 340, it is determined whether the exponent of A is equal to the exponent of B+1, i.e. whether opa is the fraction of the larger operand. If so, then at step 345 an XOR operation is performed on bit a1 of opa and bit b2 of opb, and if this results in a logic one value, then the carry-in value is set to one at step 350, whereas otherwise it is set to zero at step 355.

If at step 340, it is determined that the exponent of A does not equal the exponent of B+1, then at step 360 it is determined whether the exponent of B is equal to the exponent of A+1, i.e. whether operand B is the larger operand. If not, the carry-in value is set to zero at step 375, whereas otherwise the process proceeds to step 365. It will be appreciated that if the logic 55 knows at the time the process of FIG. 3 is being performed that the addition will pass down the near path, then it will be appreciated that steps 360 and 375 are redundant, and instead the process could proceed directly from step 340 to step 365.

At step 365 an XOR operation is performed on bit a2 of opa and bit b1 of opb, and if the result is a logic one value, the carry-in value is set to one at step 370, whereas otherwise it is set to zero at step 380.

From the above description, it will appreciated that the above embodiment of the present invention provides a technique which enables more addition operations to pass through the near path than would typically be possible using known prior art techniques, whilst maintaining reduced latency and reduced power consumption. In particular, LSA operations are allowed to pass through the near path if the exponents are equal, or if the exponents differ by one and the leading fraction bit of the larger operand is a logic one value. In such situations, the embodiment of the present invention provides a very efficient technique for introducing the required rounding increment into the near path prior to the summation being performed, in a way that requires no addition cycles, no additional computation blocks, and only a minimal amount of additional logic.

The embodiment of the present invention may be used in a variety of different data processing apparatus. For example, the embodiments of the present invention may be used in general purpose floating point processors, graphics accelerators, or high-end digital signal processors (DSPs).

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for adding n-bit significands of first and second floating point operands to produce an n-bit result, the data processing apparatus comprising:
   determination logic operable to determine which of the first and second floating point operands is the larger operand;
   first adder logic operable, if predetermined criteria exists, to perform an addition of the n-bit significands of the first and second floating point operands to produce a sum value;
   second adder logic operable, if said predetermined criteria does not exist, to perform an addition of the n-bit significands of the first and second floating point operands; and
   result logic operable to derive the n-bit result from either an output of the first adder logic or an output of the second adder logic;
   if the addition is a like-signed addition, said predetermined criteria being determined to exist for a set of situations where the sum value produced by the first adder logic will require an effective one-bit right shift to normalise the sum value; and
   if the addition is an unlike-signed addition, said predetermined criteria being determined to exist for a set of situations where the sum value produced by the first adder logic will require at least an effective one-bit left shift to normalise the sum value.

2. A data processing apparatus as claimed in claim 1, wherein said predetermined criteria is determined to exist if:
   a) the first and second floating point operands have equal exponents;
   b) the addition is a like-signed addition, the first and second floating point operands have exponents that differ by one, and the leading fraction bit of the larger operand is a logic one value; or
   c) the addition is an unlike-signed addition, the first and second floating point operands have exponents that differ by one, and the leading fraction bit of the larger operand is a logic zero value.

3. A data processing apparatus as claimed in claim 1, further comprising rounding logic operable, if said predetermined criteria exists and the addition is a like-signed addition, to determine a rounding increment value to be provided to the first adder logic prior to the first adder logic generating the sum value.

4. A data processing apparatus as claimed in claim 3, wherein the rounding logic is operable to perform rounding in accordance with a round-to-nearest rounding mode.

5. A data processing apparatus as claimed in claim 3, wherein the n-bit significands of the first and second floating point operands are extended to n+1 bits prior to being input to the first adder logic, if said predetermined criteria exists and the addition is a like-signed addition, the least significant bit of the n+1-bit extended significand of the larger operand being set to a logic one value.

6. A data processing apparatus as claimed in claim 5, wherein the rounding logic is operable to determine as the rounding increment value a carry-in value to be provided to the first adder logic, the carry-in value being set equal to the result of an XOR operation performed on a bit of the first n-bit significand and a bit of the second n-bit significand which at the time of the addition are in the least significant bit position for the n-bit result.

7. A data processing apparatus as claimed in claim 1, wherein if the predetermined criteria is determined to exist, a control signal is issued to the second adder logic to cause that second adder logic to not complete the addition of the n-bit significands of the first and second floating point operands.

8. A data processing apparatus as claimed in claim 1, wherein the first and second floating point operands are single-precision floating point operands, and n is 24.

9. A data processing apparatus as claimed in claim 1, wherein the first adder logic comprises an adder that is at least n+1 bits wide.

10. A data processing apparatus for adding n-bit significands of first and second floating point operands to produce an n-bit result, the data processing apparatus comprising:
    determination means for determining which of the first and second floating point operands is the larger operand;
    first adder means for performing, if predetermined criteria exists, an addition of the n-bit significands of the first and second floating point operands to produce a sum value;
    second adder means for performing, if said predetermined criteria does not exist, an addition of the n-bit significands of the first and second floating point operands; and
    result means for deriving the n-bit result from either an output of the first adder means or an output of the second adder means;
    if the addition is a like-signed addition, said predetermined criteria being determined to exist for a set of situations where the sum value produced by the first adder means will require an effective one-bit right shift to normalise the sum value; and
    if the addition is an unlike-signed addition, said predetermined criteria being determined to exist for a set of situations where the sum value produced by the first adder means will require at least an effective one-bit left shift to normalise the sum value.

11. A method of operating a data processing apparatus to add n-bit significands of first and second floating point operands to produce an n-bit result, the method comprising the steps of:
    determining which of the first and second floating point operands is the larger operand;
    if predetermined criteria exists, employing first adder logic to perform an addition of the n-bit significands of the first and second floating point operands to produce a sum value;
    if said predetermined criteria does not exist, employing second adder logic to perform an addition of the n-bit significands of the first and second floating point operands; and
    deriving the n-bit result from either an output of the first adder logic or an output of the second adder logic;
    if the addition is a like-signed addition, said predetermined criteria being determined to exist for a set of situations where the sum value produced by the first adder logic will require an effective one-bit right shift to normalise the sum value; and
    if the addition is an unlike-signed addition, said predetermined criteria being determined to exist for a set of situations where the sum value produced by the first adder logic will require at least an effective one-bit left shift to normalise the sum value.

* * * * *